United States Patent [19]
Ogawa et al.

[11] 3,876,494
[45] Apr. 8, 1975

[54] BINDING MATERIALS HAVING GOOD TEXTURE AND HIGH IMPACT RESISTANCE

[75] Inventors: Tomio Ogawa, Osaka; Taro Harada, Suita; Nobuo Ito, Ibaragi; Kanemitsu Ohishi, Toyonaka; Yoshifumi Nishibayashi, Sennan; Kazunobu Shiozawa, Izumisano, all of Japan;

[73] Assignee: Sumitom Chemical Company, Limited; Toyo Cloth Co., Ltd., both of Osaka, Japan

[22] Filed: Jan. 2, 1974

[21] Appl. No.: 429,590

[30] Foreign Application Priority Data
Jan. 9, 1973  Japan.................................. 48-5766

[52] U.S. Cl................ 161/116; 156/211; 156/214; 161/99; 161/159; 161/247; 260/93.7
[51] Int. Cl............................................... B32b 3/00
[58] Field of Search............ 161/116, 124, 159, 247, 161/99, 119; 260/93.7; 156/250, 211, 214

[56] References Cited
UNITED STATES PATENTS

| | | | |
|---|---|---|---|
| 2,952,260 | 9/1960 | Burgeni | 161/124 |
| 3,378,432 | 4/1968 | Spencer | 161/116 |
| 3,573,153 | 3/1971 | Ryan, Jr. | 161/159 |
| 3,649,398 | 3/1972 | Keith | 156/79 |

*Primary Examiner*—William J. Van Balen
*Attorney, Agent, or Firm*—Stevens, Davis, Miller & Mosher

[57] ABSTRACT

A binding material having a good texture and high impact resistance is produced by melt-extruding a mixture of a foaming agent and a polypropylene composition consisting essentially of 40 to 75 percent by weight of crystalline polypropylene and 25 to 60 percent by weight of non-crystalline polypropylene, up to 60 percent by weight of which may be replaced by low density polyethylene, into a foamed polypropylene sheet, subjecting the foamed sheet to hinge-processing to provide the sheet with hinge portion. The foamed polypropylene sheet may be embossed prior to cooling the sheet to solidify the same.

9 Claims, 8 Drawing Figures

FIG.1
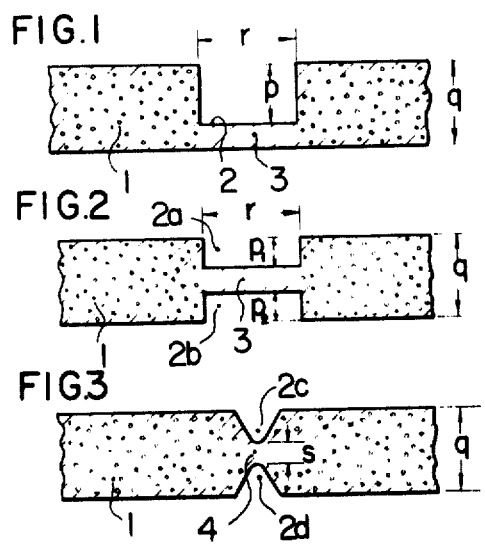
FIG.2
FIG.3
FIG.4
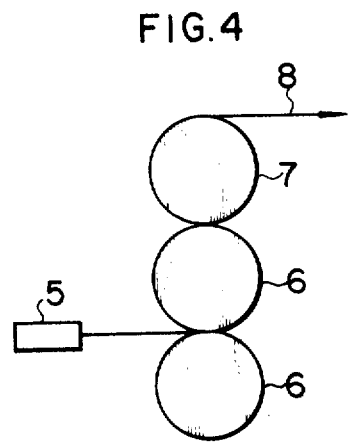
FIG.5a
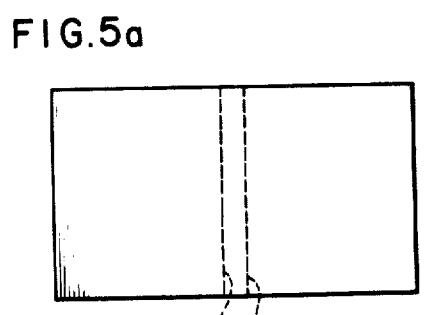
FIG.5b
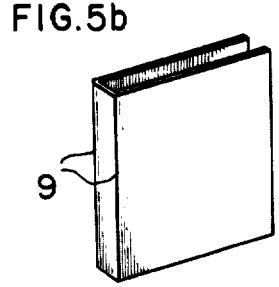
FIG.6a
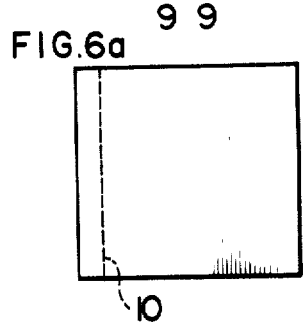
FIG.6b
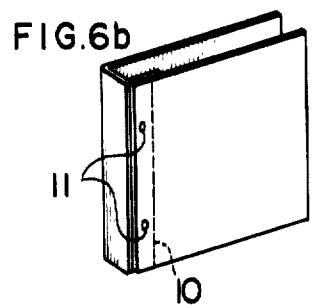

BINDING MATERIALS HAVING GOOD TEXTURE AND HIGH IMPACT RESISTANCE

This invention relates to a binding material having a good texture and excellent impact resistance and consisting of foamed polypropylene.

Hitherto, there have been commercially available and known documents-binders obtained by subjecting a non-foamed polypropylene sheet to hinge processing. Such a non-foamed polypropylene sheet is rigid, and low in impact resistance, and the texture of the sheet is cold. When the sheet is stamped, the edges of concaves are protuberant, and when the sheet is subjected to foil-stamping, the stamping per se is difficult and the foil tends to be peeled off. In addition, when the non-foamed polypropylene sheet is embossed, the embossed pattern is too shallow. Moreover, when the non-foamed polypropylene sheet is pressed by a mold at the center to form a hinge in order to use the sheet as a document-binder, it is impossible to form a deep groove for hinge and the hinge portion is whitened in some cases.

Japanese Utility Model Registration Application No. 114,463/1972 discloses a document-binder prepared by heat-pressing a foamed polypropylene sheet on its one side with a metallic mold edge to form a groove and folding the sheet at the grooved portion so that the groove is inside. This document-binder is lighter and more flexible than that made of a non-foamed polypropylene sheet, and is in particular easy to emboss on its surface. Therefore, the appearance and texture are enhanced, and the handling of documents kept is facilitated. However, the foamed polypropylene sheet consists mainly of crystalline polypropylene and is prepared by extruding a mixture of crystalline polypropylene and a foaming agent, and hence, the texture of the sheet is still insufficient and the impact resistance thereof is somewhat inferior.

Japanese Patent Application No. 20,355/1972 discloses a foamed polypropylene sheet having impact resistance and a good texture obtained by molding a mixture of a foaming agent and a polymer composition consisting of 40 to 75 percent by weight of crystalline polypropylene and 25 to 60 percent by weight of non-crystalline polypropylene or the polymer composition in which up to 60 percent by weight of the non-crystalline polypropylene has been replaced by low density polyethylene. However, at the time of filing the above application, it was not known whether or not the above foamed polypropylene sheet is suitable as binding materials, such as a document-binder.

The inventors of this invention have done further research as to whether or not the above foamed polypropylene sheet is appropriate as binding materials to achieve this invention.

An object of this invention is to provide a binding material having a good texture.

Another object of this invention is to provide a binding material having high impact resistance.

A further object of this invention is to provide a binding material made of a foamed polypropylene sheet.

A still further object of the invention is to provide a process for preparing a binding material having a good texture and high impact strength.

Other objects and advantages of the invention will become apparent from the following description.

According to this invention, there is provide a binding material having a good texture and high impact resistance, which consists of a foamed sheet of a polypropylene composition consisting essentially of 40 to 75 percent by weight of crystalline polypropylene and 25 to 60 percent by weight of non-crystalline polypropylene, up to 60 percent by weight of which may be replaced by low density polyethylene, said foamed sheet having a hinge portion.

The above binding material can be prepared by melt-extruding a mixture of a foaming agent and the polypropylene composition into a foamed polypropylene sheet and then subjecting the foamed sheet to hing-processing to provide the sheet with a hinge portion.

The crystalline polypropylene used in the polypropylene composition includes crystalline homopolymer of propylene, crystalline copolymers of propylene and ethylene or other α-olefin and mixtures of the homopolymer and the copolymers. The non-crystalline polypropylene used in the polypropylene composition includes substantially non-crystalline polypropylene and propylene copolymers which have been prepared as the by-products in the preparation of the above crystalline homopolymer or copolymers of propylene and which are soluble in heptane.

The polypropylene composition contains 40 to 75 percent, preferably 50 to 75 percent, by weight of the crystalline polypropylene and 25 to 60 percent, preferably 25 to 50 percent, by weight of the non-crystalline polypropylene. When the proportion of the crystalline polypropylene is less than 40 percent by weight, namely when the proportion of the non-crystalline polypropylene exceeds 60 percent by weight, the resulting binding material is too soft and its self-supportability as binding material becomes low. On the other hand, when the proportion of the crystalline polypropylene exceeds 75 percent by weight, the impact resistance of the resulting binding material becomes low and the texture thereof becomes unfavorable.

A low density polyethylene may be substituted for a part of the non-crystalline polypropylene in the polypropylene composition, and said polyethylene has a specific gravity of 0.94 or less and includes homopolymer of ethylene and copolymers of ethylene and vinyl acetate or ethyl acrylate. The low density polyethylene is substituted for up to 60 percent, preferably up to 50 percent, by weight of the non-crystalline polypropylene. When the low density polyethylene is substituted for more than 60 percent by weight of the non-crystalline polypropylene, the compatibility between the low density polyethylene and the crystalline polypropylene or the non-crystalline polypropylene becomes insufficient so that the purpose of this invention cannot be achieved.

The foaming agent added to the polypropylene composition is a thermal decomposition type foaming agent and includes, for example, azodicarbonamide, dinitrosopentamethylene tetramine and the like. The amount of the foaming agent to be added is preferably 0.5 to 2.0 parts by weight per 100 parts by weight of the polypropylene composition.

The polypropylene composition may contain a pigment, a filler, a light stabilizer, a weather stabilizer or the like according to the purpose.

The mixture of the polypropylene composition and the foaming agent is heated to melt the same and the molten mixture is then extruded by a conventional method to form a foamed polypropylene sheet. The foaming ratio of the foamed polypropylene sheet, namely the ratio of the specific gravity of the foamed polypropylene sheet to the specfic gravity of the unfoamed polypropylene sheet, is preferably 1.2 to 2.0, particularly preferably 1.3 to 1.5. The thickness of the foamed polypropylene sheet may be varied depending upon the purpose of use, though it is usually within the range of 0.03 to 6 mm.

In the production of the foamed polypropylene sheet, the sheet in the soft state may be embossed by means of embossing rolls having a concave and convex pattern on their surfaces to impart an embossed pattern to the surface of the Sheet. The thus embossed foamed polypropylene sheet, when used as a document-binder or a cover for a book, can give a good appearance and facilitate the turning of pages because papers do not stick to the cover. Since such a practical effect is obtained, the embossed sheet is particularly preferable.

In order to use the foamed polypropylene sheet as a binding material, it is necessary to provide the sheet with a hinge portion at the desired position of the sheet by subjecting the sheet to hinge-processing to facilitate the folding of the sheet. In order to provide the surface of the foamed polypropylene sheet with a hinge portion, a metallic mold or molds are applied with heating under pressure to one side or both sides of the sheet to form a U-shape groove or grooves, or alternatively, the foamed polypropylene sheet is repeatedly bent to form grooves at the bending position on both sides of the sheet.

This invention is further explained referring to the accompanying drawings, in which FIG. 1 is an enlarged sectional view of the hinge portion formed by heat pressing one side of the sheet of this invention by means of a metallic mold, FIG. 2 is an enlarged sectional view of a hinge portion formed by heat-pressing both sides of the sheet by means of metallic molds, FIG. 3 is an enlarged sectional view of a hinge portion formed by repeatedly folding the sheet, FIG. 4 is an explanatory diagram for an example of embossing machine, FIGS. 5(a) and 5(b) are a front view and a sketch, respectively, of a cover and FIGS. 6(a) and 6(b) are a front view and a sketch, respectively, of a cover for bookbinding of a detaching type. de In FIG. 1, which shows a hinge portion formed by pressing one side of a foamed polypropylene sheet by means of a metallic mold, the pressed portion 3 at the bottom of the U-shape groove formed in the porous portion 1 is in the non-foamed state, and the depth $p$ of the U-shape groove is at least one-half of the thickness $q$ of the porous portion 1, and the width $r$ of the U-shape groove 2 is 0.3 to 2.5 times, preferably 0.5 to 2.0 times the thickness $q$ of the porous portion 1. Further, the width $r$ of the U-shape groove 2 is at least 1.5 times, preferably at least 2 times, the depth $p$. That is, the folding characteristics of the hinge portion is enhanced by providing the U-shape groove so as to satisfy the following relations: $p \geq 0.5q$, $r \geq 1.5p$ and $0.3q \leq \gamma \leq 2.5q$, whereby opening and closing become free.

In FIG. 2, which shows the hinge portion formed by pressing both sides of a foamed polypropylene sheet by means of metallic molds, U-shape grooves 2a and 2b are formed on both sides of the sheet, and the total sum of the depths $p_1$ and $p_2$ of the respective U-shape grooves corresponds to the depth $p$ of the U-shape groove shown in FIG. 1. The depth $p_1 + p_2$ and the width $r$ of the U-shape grooves are in the relation as explained above concerning FIG. 1.

In FIG. 3, molecular orientation and crystallization are caused by repeatedly folding front and back a foamed polypropylene sheet at the desired position. In this case, the thickness $s$ of the folding portion 4 is about one-half of the thickness $q$ of the foamed polypropylene sheet or somewhat thinner than that. Usually, the difference in thickness cannot grossly be recognized.

The binding material of this invention has excellent self-supportability, and the hinge portion of the binding material is not whitened. Further, the binding material is soft and excellent in impact resistance. Furthermore, it is easy to stamp or foilstamp the surface of the foamed polypropylene sheet, and the thus stamped or foil-stamped sheet has a leather-like texture.

The binding material of this invention is suitable for a document-binder, a cover for books and notebooks, and the like.

This invention is further explained below referring to Examples, which are not by way of limitation but by way of illustration. In the Examples, all parts are by weight unless otherwise specified, the melt index of crystalline polypropylene was measured at 230°C under a load of 2,160 g, the melt index of low density polyethylene was measured at 190°C under a load of 2,160 g according to ASTM D 1238, and the intrinsic viscosity of non-crystalline polypropylene was measured in a tetralin solution at 135°C.

EXAMPLES 1 to 4

Crystalline polypropylene, non-crystalline polypropylene, and low density polyethylene were blended in the proportions shown in Table 1, and the resulting mixture was well mixed by means of an extruder and then formed into pellets. The pellets were blended with 0.5 part by weight of azodicarbonamide, as a forming agent, and then extruded from the die 5 as shown in FIG. 4 at a resin temperature of 180° – 220°C, and the resulting molten foamed resin was embossed by two embossing rolls 6 having an engrave pattern on their surface while the resin was not cooled and solidified, after which the embossed sheet was passed through a finishing roll 7 for conventional mirror finishing to obtain an embossed foamed polypropylene sheet 8 having a foaming ratio of 1.3 to 1.4. Physical properties of this foamed polypropylene sheet are shown in Table 1, in which for comparison there are indicated physical properties of foamed polypropylene sheets obtained in the same way as above, except that the proportions of the polymers were outside the range of this invention as Comparative Examples 1 to 5.

Table 1

|  | Examples | | | | Comparative Examples | | | | |
|---|---|---|---|---|---|---|---|---|---|
|  | 1 | 2 | 3 | 4 | 1 | 2 | 3 | 4 | 5 |
| Composition (parts) | | | | | | | | | |
| Crystalline polypropylene (MI = 1 g/10 min.) | 50 | — | — | — | 80 | — | 90 | 35 | 100 |
| Crystalline polypropylene (MI = 3g/10 min.) | — | α | — | — | — | — | — | — | — |

Table 1—Continued

|  | Examples | | | | Comparative Examples | | | | |
|---|---|---|---|---|---|---|---|---|---|
|  | 1 | 2 | 3 | 4 | 1 | 2 | 3 | 4 | 5 |
| Crystalline propylene-ethylene copolymer (MI = 1 g/10 min., ethylene content = 4.5 wt. %) | — | — | 70 | 70 | — | — | — | — | — |
| Crystalline propylene-ethylene copolymer (MI = 8 g/10 min., ethylene content = 4.5 wt. %) | — | — | — | — | — | 80 | — | — | — |
| Non-crystalline polypropylene (intrinsic viscosity = 0.4 g/cc) | 25 | 20 | 15 | 30 | 10 | 20 | 10 | 65 | — |
| Low density polyethylene (MI = 2 g/10 min.) | 25 | 20 | 15 | — | 10 | — | — | — | — |
| Impact resistance (1) (kg/cm$^2$) | 20 | 20 | 20 | 15 | 5 | 6 | 5 | 20 | 5 |
| Impact resistance (2) | o | o | o | o | x | x | x | o | x |
| Stiffness (kg/cm$^2$) | 600 | 730 | 900 | 1000 | 1750 | 1600 | 1800 | 500 | 2000 |
| Texture | Good | Good | Good | Good | Bad | Bad | Bad | Bad | Bad |

In Table 1, the impact resistance (1) shows tear strength of Elemendorf measured according to the method of JIS Z-1702 (1962) 7.5 (JIS is an abbreviation of Japan Industrial Standards). The impact resistance (2) shows the result of a test by which a sample sheet having a length of 40 cm and a width of 20 cm in the direction perpendicular to the extrusion direction of the extruded sheet was cut off from the extruded sheet and then folded so that one end of the logitudinal direction was put on the other end, after which the folded portion was slapped to examine whether or not the folded portion was cracked. o refers to not cracked, and x to cracked. The stiffness shows the torsion stiffness measured at 20°C by means of a Clash-Berg softening temperature measuring machine according to the method of JIS K-6745 (1963) 7.3. In the texture, "Good" refers to a soft, leather-like, good texture. Further, in Table 1, "MI" refers to melt index and "polypropylene" means homopolymer of propylene.

As is clear from Table 1, the foamed polypropylene sheets in Examples 1 to 4 which are within the range of this invention and excellent in impact resistance, have an appropriate stiffness and softeness and have a leather-like, soft, favorable texture.

EXAMPLES 5 to 8

Using the foamed polypropylene sheets obtained in Examples 1 to 4 and Comparative Examples 1 to 5, (A) covers for books and notebooks, (B) covers for detaching type bookbinding and (C) files were prepared and subjected to a test on properties as binding material. The results obtained are shown in Table 2, in which Comparative Example 11 relates to a file of a commercially available, non-foamed polypropylene sheet.

A. The covers for books and notebooks were prepared by cutting the foamed polypropylene sheet to a B4 size and then bending 5 times the cut sheet in the neighbourhood of the center to form two hinge lines 9 as shown in FIG. 5 (a) (see FIG. 3), from which a cover as shown in FIG. 5(b) was prepared.

B. The covers for detaching type bookbinding were prepared by cutting the foamed polypropylene sheet to a A4 size, pressing one side of the cut sheet in the position 2 cm distant from the end with a metallic mold heated at 160°C under a pressure of 5 kg/cm$^2$ for 0.3 second as shown in FIG. 6(a) to form a hinge portion 10 (see FIG. 1), and then punching two holes 11 having a diameter of 3 mm in the sheet as shown in FIG. 6(b).

C. The files were prepared by pressing both sides of the foamed polypropylene sheet with metallic molds heated at 160°C under a pressure of 2 kg/cm$^2$ for 1 second to form two hinge lines (see FIG. 2), fixing a catch for document in the vicinity of the hinge portion, and then folding the sheet at the hinge portion so that the catch for document was inside.

In Table 2, the impact resistance at the hinge portion was measured by the method of JIS K-6772 (at −40°C), and o refers to no change and x to broken. The self-supportability was measured by standing the cover or file with 1 kg of documents filed therein on a desk and observing the bending state of the cover. "Good" means that the end of the cover contacting the desk was not bent and "Bad" means that the cover was bent and deformed. The stamping and foil-stamping properties were determined by stamping and foil-stamping the cover at room temperature and observing the state after stamping and foil-stamping. o refers to sharp and good state, and x to protuberant edge of groove.

Table 2

|  |  | Examples | | | | Comparative Examples | | | | | |
|---|---|---|---|---|---|---|---|---|---|---|---|
|  |  | 5 | 6 | 7 | 8 | 6 | 7 | 8 | 9 | 10 | 11 |
| Kind of sheet (Example No.) |  | 1 | 2 | 3 | 4 | 2 | 1 | 4 | 3 | 5 | Commercial product |
| Thickness (mm) |  | 0.4 | 0.8 | 1.0 | 2.0 | 0.4 | 0.8 | 0.8 | 1.0 | 2.0 | 0.8 |
| Shape of cover |  | (A) | (B) | (C) | (B) | (A) | (B) | (B) | (C) | (B) | (C) |
| Hinge portion | Depth (mm) | — | 0.7 | 0.9 | 1.3 | — | 0.7 | 0.7 | 0.9 | 1.3 | 0.7 |
|  | Width (mm) | — | 1.1 | 1.5 | 3.0 | — | 1.1 | 1.1 | 1.5 | 3.0 | 1.1 |
| Impact strength of hinge portion |  | o | o | o | o | x | x | o | x | x | x |
| Self-supportability |  | Good | Good | Good | Good | Good | Good | Bad | Good | Good | Good |
| Stamping, foil-stamping |  | o | o | o | o | o | o | o | o | o | x |

What is claimed is:

1. A binding material having a good texture and high impact resistance which consists of a foamed sheet of a polypropylene composition consisting essentially of 40 to 75 percent by weight of crystalling polypropylene and 25 to 60 by weight of non-crystalline polypropylene, the foamed sheet having a hinge portion.

2. A binding material according to claim 1, wherein up to 60 percent by weight of the non-crystalline polypropylene is replaced by low density polyethylene.

3. A binding material according to claim 1, wherein the polypropylene composition consists of 50 to 75 percent by weight of the crystalline polypropylene and 25 to 50 percent by weight of the non-crystalline polypropylene.

4. A binding material according to claim 3, wherein up to 50 percent by weight of the non-crystalline polypropylene is replaced by low density polyethylene.

5. A binding material according to claim 1, wherein the crystalline polypropylene is selected from the group consisting of crystalline homopolymer of propylene and crystalline copolymers of propylene and ethylene or other alpha-olefins.

6. A binding material according to claim 2, wherein the low density polyethylene has a specific gravity of 0.94 or less and is selected from the group consisting of homopolymer of ethylene and copolymers of ethylene and vinyl acetate or ethyl acrylate.

7. A binding material according to claim 1, wherein the foamed sheet has a thickness of 0.03 to 6 mm.

8. A binding material according to claim 1, wherein the foamed sheet has an embossed pattern on the surface.

9. A binding material according to claim 1, wherein the foamed sheet has a foaming ratio of 1.2 to 2.0.

* * * * *